J. P. GILLESPIE.
Machines for Cutting Grindstones.

No. 137,435. Patented April 1, 1873.

Witness:
Henry N. Miller
C. L. Evert

Inventor.
J. P. Gillespie
per
Attorneys.

UNITED STATES PATENT OFFICE.

JAMES P. GILLESPIE, OF LOUISVILLE, KENTUCKY.

IMPROVEMENT IN MACHINES FOR CUTTING GRINDSTONES.

Specification forming part of Letters Patent No. 137,435, dated April 1, 1873; application filed November 21, 1872.

*To all whom it may concern:*

Be it known that I, JAMES P. GILLESPIE, of Louisville, in the county of Jefferson and in the State of Kentucky, have invented certain new and useful Improvements in Machine for Cutting Grindstones; and do hereby declare that the following is a full, clear, and exact description thereof, reference being had to the accompanying drawing and to the letters of reference marked thereon making a part of this specification.

The nature of my invention consists in the construction and arrangement of a machine for cutting grindstones, as will be hereinafter more fully set forth.

In order to enable others skilled in the art to which my invention appertains to make and use the same, I will now proceed to describe its construction and operation, referring to the annexed drawing, in which—

Figure 1:
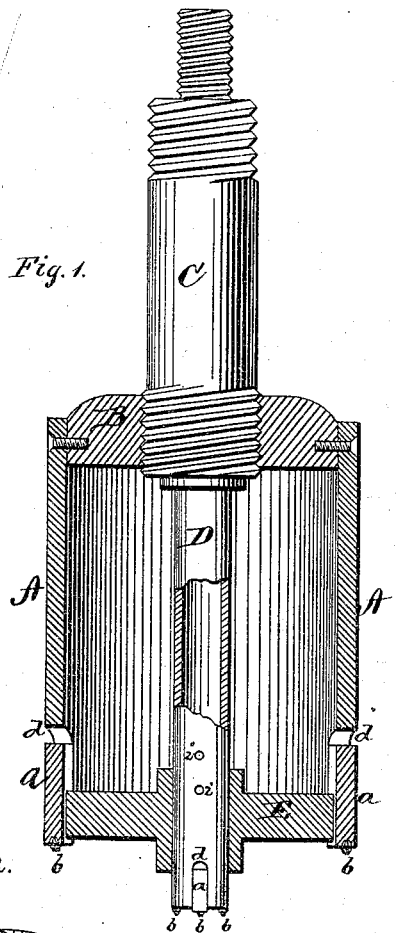
Figure 2:
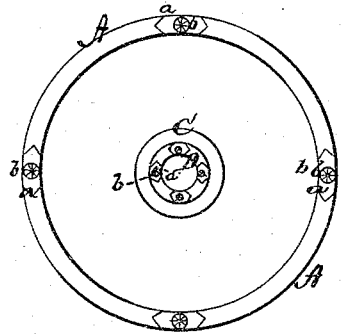
Figure 3:
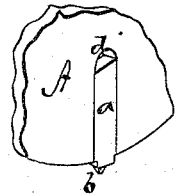

Figure 1 is a longitudinal section of my machine. Fig. 2 is an end view of the same; and Fig. 3 is a section of the outside cylinder, showing one of the removable teeth in the same.

A represents the large outside cylinder, of the diameter on the inside that the grindstone is to have. One end of this cylinder is closed by a head, B, and through the center of the same passes a pipe-shaft, C. Through the center of this shaft passes the tubular center-bit D, the lower end of which extends below the end of the outside cylinder A for a suitable distance. In the end of the cylinder A, as well as in the end of the center tube D, are made slots for the insertion of steel teeth *a a*, said teeth having V-shaped or beveled edges, which fit in grooves made in the sides of said slots, and in the ends of the teeth are inserted diamond or carbon points *b b*, forming the cutters. Above the teeth *a a* the grooves form holes *d d* for the insertion of a suitable instrument, by means of which the teeth may be removed at will. Around the center-bit D is placed a circular disk, E, which fits within the cylinder A and forms a sliding guide for the center-bit.

The mode of operating this improvement in the cutting of grindstones and drilling of rocks is to first start in the center-bit. This having gained a sufficient depth in the stone, say half an inch, more or less, then the outside or large cutter begins to cut the periphery of the grindstone. Both these cut together until the stone is finished, the hole in the center being absolutely a true center, the grindstone coming from the machine complete and ready for use.

The sliding piece E which surrounds the center-bit acts as a brace to that bit when the outside cutter or bit begins to cut, and so protects the center-bit until the outside cutter is well established in its groove. This sliding brace moves upward in the machine as the cutting progresses, acting in the same capacity of brace to the center until the process is finished.

The cutters or bits may be used or rotated in any of the known drill-presses, and are adjusted in the drill-stock by a screw-thread or other secure fastening, and may be run at any desired speed.

A jet or stream of water may be run or forced down through the center bit or pipe and out through the holes *i i* in the same, thereby keeping the cutters cool and clearing away the cuttings so as to give free play to the cutters or bits.

The adjustable diamond or carbon pointed steel teeth can be removed from one bit or cutter and set in any other pipe bit or cutter of different size, thus enabling the operator to cut many different sizes of grindstones with the same teeth. In removing and resetting the teeth in another cutter or pipe bit a suitable steel tool is inserted below the tooth in the semicircular hole *d* made for that purpose, and the tooth is then pried up or started from its groove or socket, thus being easily and quickly removed and reset in a corresponding socket in another sized pipe, being driven firmly home into its socket to a suitable depth. The teeth are thus removed from one bit or cutter and reset in another in a few moments of time.

Having thus fully described my invention, what I claim as new, and desire to secure by Letters Patent, is—

1. The combination, in a machine for cutting grindstones, of the exterior cylinder A provided with a series of diamond points, $b$, and the central shaft or pipe D with diamond points $b$ on its end, all substantially as set forth.

2. In combination with a rotating cylinder, A or D, the longitudinally-adjustable and removable diamond-carrying teeth $a$, connected to the cylinder by a dovetail, substantially as herein set forth.

3. In combination with two tubular holders provided with diamond or carbon pointed steel teeth and one within the other, a circular sliding brace, E, surrounding the inner tube and fitting within the other, substantially as and for the purposes herein set forth.

In testimony that I claim the foregoing I have hereunto set my hand this 31st day of October, 1872.

J. P. GILLESPIE.

Witnesses:
   C. L. EVERT,
   A. N. MARR.